United States Patent
Kreuzer et al.

[11] Patent Number: 5,900,688
[45] Date of Patent: * May 4, 1999

[54] ELECTRICAL GENERATOR FOR VEHICLE WITH ROTOR EXCITER WINDING DISPOSED ON WINDING CARRIER

[75] Inventors: Helmut Kreuzer, Schwieberdingen, Germany; Oliver Eckert, Cowbridge, United Kingdom

[73] Assignee: Robert Bosch GmbH, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/836,165
[22] PCT Filed: Nov. 25, 1995
[86] PCT No.: PCT/DE95/01674
§ 371 Date: Apr. 3, 1997
§ 102(e) Date: Apr. 3, 1997
[87] PCT Pub. No.: WO96/19033
PCT Pub. Date: Jun. 20, 1996

[30] Foreign Application Priority Data

Dec. 14, 1994 [DE] Germany .................. 94 19 991 U

[51] Int. Cl.$^6$ ................................................. H02K 19/22
[52] U.S. Cl. .................... 310/194; 310/234; 310/263; 29/605
[58] Field of Search .................... 310/234, 263, 310/194, 49 A, 49 R; 336/208; 29/605

[56] References Cited

U.S. PATENT DOCUMENTS

| | | | |
|---|---|---|---|
| 2,339,432 | 1/1944 | Stahl | 242/119 |
| 3,603,825 | 9/1971 | Sheridan et al. | 310/194 |
| 3,671,906 | 6/1972 | Hodges et al. | 336/208 |
| 5,021,696 | 6/1991 | Nelson | 310/62 |
| 5,361,011 | 11/1994 | York | 310/194 |

FOREIGN PATENT DOCUMENTS

| | | | |
|---|---|---|---|
| 2421528 | 11/1975 | Germany | 310/214 |
| 369212 | 6/1963 | Switzerland | 336/208 |

*Primary Examiner*—Thomas M. Dougherty
*Assistant Examiner*—K. Eizo I. Tamai
*Attorney, Agent, or Firm*—Michael J. Striker

[57] ABSTRACT

An electrical machine, especially a generator for vehicles, having a rotor rotatably supported in a stator housing is proposed, the rotor having an exciter winding (24), disposed in a manner fixed against relative rotation coaxially to a rotor shaft, the winding ends (26, 28) of the exciter winding being extended to wiper rings disposed on the rotor shaft. For the sake of simple centrifugal force-proof fixation of the exciter winding, it is provided that the exciter winding (24) is disposed on a winding carrier (11), which has means (32, 33) for firmly clamping the winding ends (26, 28) (FIG. 2).

12 Claims, 3 Drawing Sheets

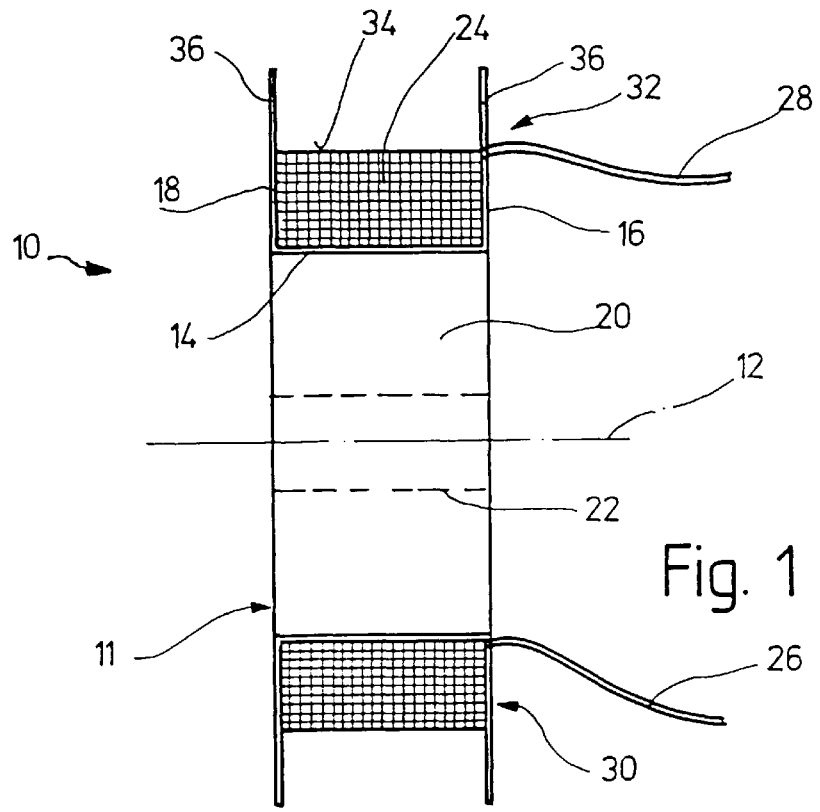
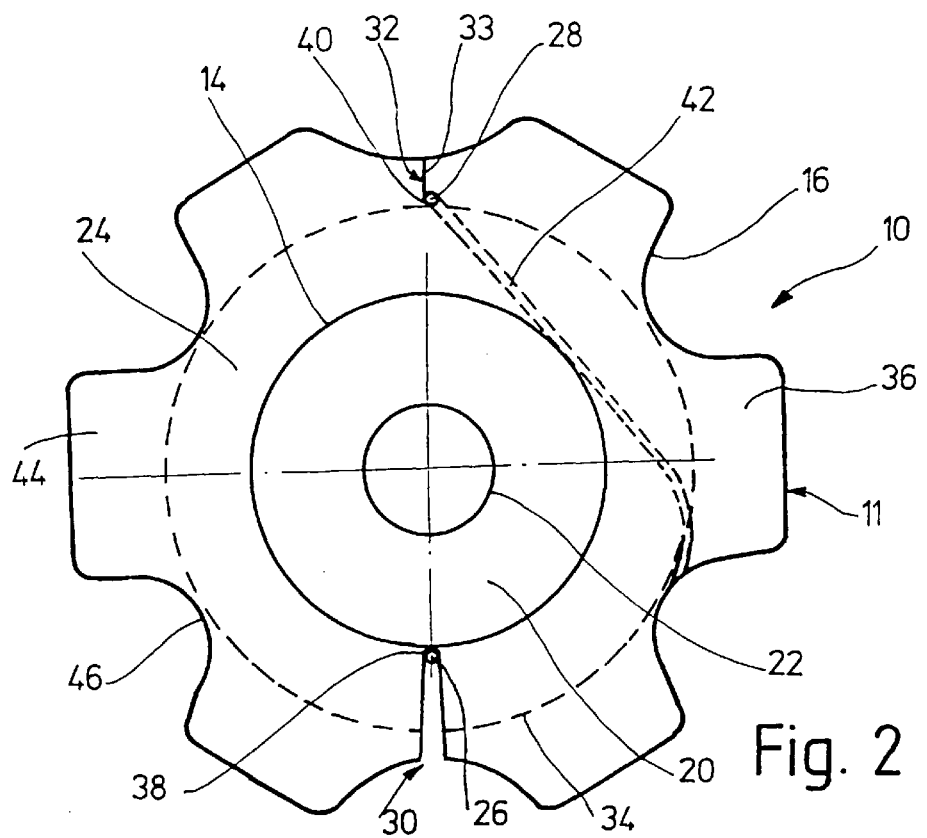

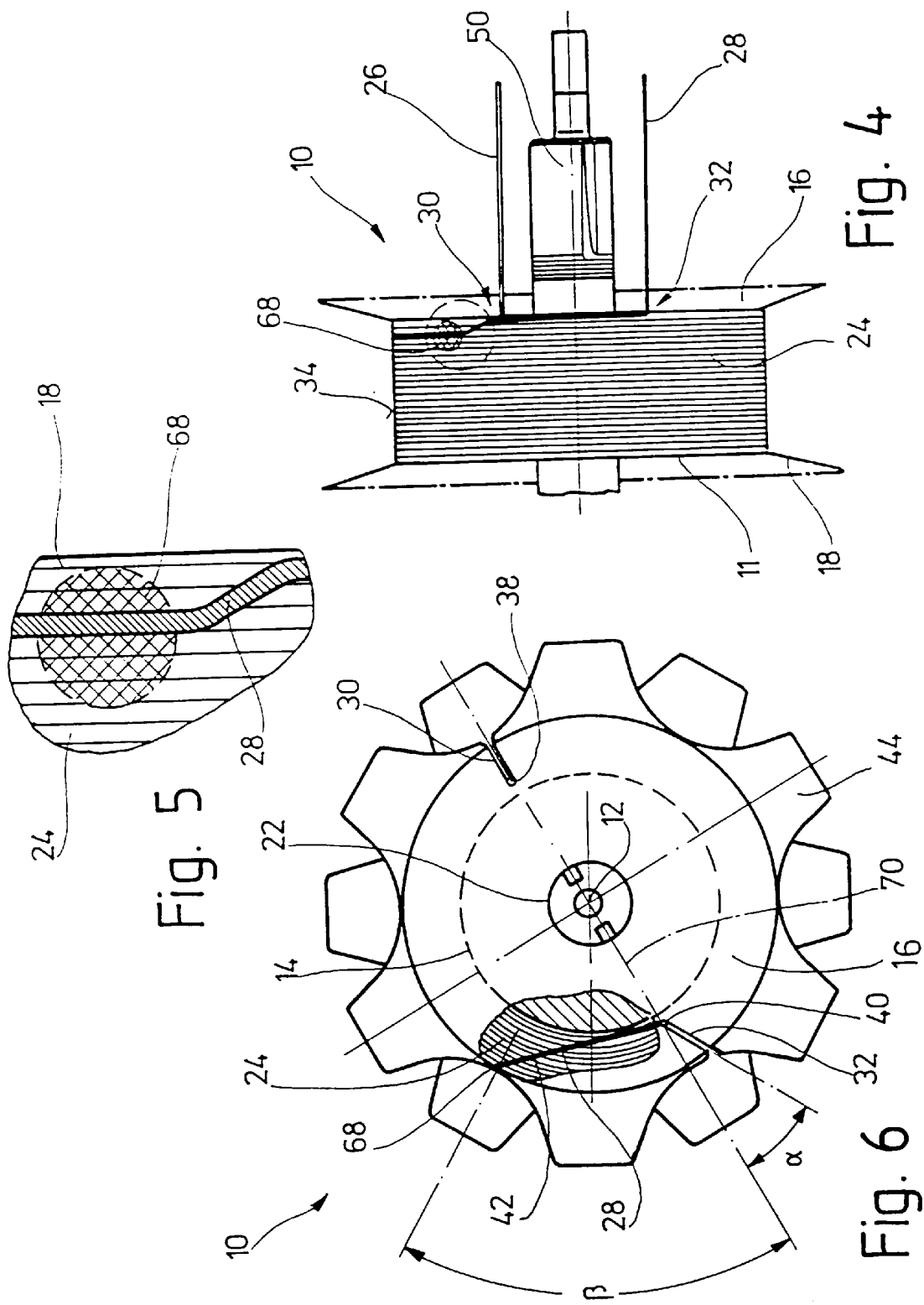

5,900,688

ELECTRICAL GENERATOR FOR VEHICLE WITH ROTOR EXCITER WINDING DISPOSED ON WINDING CARRIER

BACKGROUND OF THE INVENTION

The invention relates to an electrical machine, in particular a generator for vehicles.

PRIOR ART

In vehicles, such as motor vehicles and railroad cars, it is known to use generators for battery charging and as an on-board power supply. To that end, the generators have a claw pole rotor, rotatably supported in a stator housing. The claw pole rotor has an exciter winding, disposed coaxially to a rotor shaft and in a manner fixed against relative rotation, and pole fingers of the claw poles fit over its circumferential surface. The exciter winding is disposed on a pole core, which is connected to the rotor shaft in a manner fixed against relative rotation. For fixing the exciter winding to the pole core, it is known to bind the exciter winding with bands after the winding operation, so as to achieve a disposition of the exciter winding in a manner fixed against relative rotation. Hooks, adhesive tapes, etc. may be used in addition, which are intended to assure a stable position of the exciter winding in the period until its impregnation and mounting. A disadvantage, however, is that impregnation of the exciter winding is made more difficult by the binding bands, since the impregnating agent is hindered from uniformly entering the exciter winding. Another disadvantage is that because of the additional disposition of fastening means and binding bands, an imbalance of the exciter winding can occur, which can cause vibration especially in extremely high-speed claw pole rotors. The binding bands can also come loose, which can impair the operation, if it does not even cause destruction of the entire-electrical machine.

SUMMARY OF THE INVENTION

In an electrical machine in accordance with the invention, it is possible, unlike the prior art, to dispose the exciter winding on the rotor shaft in a manner that is secure against being shaken and spun apart by centrifugal force. Because the exciter winding is disposed on a winding carrier that has means for firmly clamping the winding ends, it is possible in a simple way to fix the exciter winding without requiring the additional disposition of binding bands or the like. On the one hand, this avoids adding elements that cause imbalance of the exciter winding, and on the other, it assures accessibility of the exciter winding over the entire surface for the introduction of impregnating agents. As a result, improvements in quality of the exciter windings are attained, since better penetration of the impregnating agent is assured over the entire depth of the exciter winding. Because binding bands and additional retaining means are omitted, the production cost for prefabricating the exciter winding can also be reduced, since less time and less material are needed.

In a preferred feature of the invention, it is provided that the winding carrier is formed by an insulating body, which encompasses the exciter winding in U-like fashion and whose flange toward the wiper rings has recesses open at the edges, for receiving the winding beginning and the winding end. As a result it becomes possible in a simple way at the beginning of the winding operation of the exciter winding to extend the winding beginning through a first recess, and after the conclusion of the winding operation to extend the winding end through a second recess. Because the winding ends are fixed in the recesses of the winding carrier, an additional locking of the entire exciter winding is no longer necessary. The recesses are preferably embodied such that they have a radial length such that the winding beginning and the winding end can be clamped in place in alignment with the inside circumference and outside circumference of the exciter winding. By means of a special embodiment of the recesses, preferably by a recess embodied as a notch in the direction of the rotor shaft, a self-inhibiting locking of the winding end is attained, which assures a shakeproof and centrifugal force-proof seating even at high rotary speeds of the rotor assembly.

BRIEF DESCRIPTION OF THE DRAWINGS

The invention will be described in further detail below in exemplary embodiments in conjunction with the associated drawings. Shown are:

FIG. 1, a sectional view through a winding carrier with an exciter winding laid in place;

FIG. 2, a side view of a winding carrier;

FIG. 4, a plan view on an exciter coil;

FIG. 5, a detail view; and

FIG. 6, a partially cut-away side view of an exciter coil.

DESCRIPTION OF THE PREFERRED EMBODIMENTS

Figure 3:
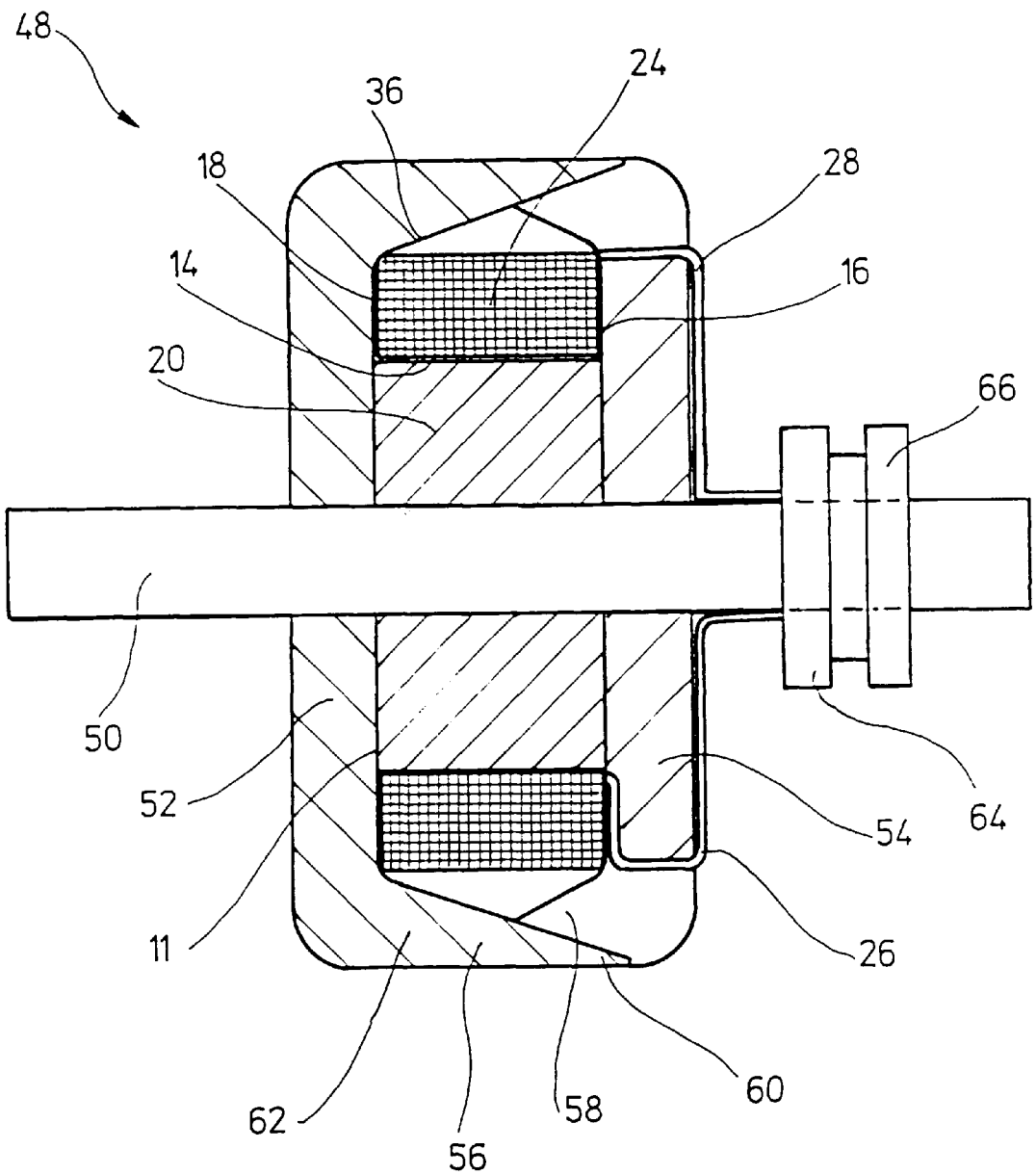
FIG. 3, a sectional view of an end-mounted rotor assembly.

In FIG. 1, an exciter coil of a claw pole generator is shown and designated in general by reference numeral 10. The exciter coil 10 has a winding carrier 11 of insulating material, which comprises a tube portion 14, disposed coaxially to an axis of rotation 12 shown in suggested fashion here, and which terminates on both ends in a radial flange 16 and 18. The tube portion 14 is disposed on a pole core 20, which has an axial through opening 22 for receiving a rotor shaft shown in FIG. 3. The winding carrier 11 here is made of a plastic and fits in a U around an exciter winding 24. The exciter winding 24 has a winding beginning 26 and a winding end 28, which are merely schematically suggested here. The flange 16 shown on the right in FIG. 1, which in a manner to be explained hereinafter is oriented toward wiper rings of a rotor assembly, has radially extending recesses 30 and 32—as can be seen in FIG. 2—which are embodied for receiving the winding beginning 26 and the winding end 28, respectively. The recesses 30 and 32 are open on their periphery; that is, they are embodied as radially outward-extending notches. The flanges 16 and 18 of the winding carrier 11 have portions 36 on their outer circumference that protrude past an outer jacket face 34 of the exciter winding 24.

The winding operation for producing the exciter winding 24 will now be explained briefly, referring to FIG. 1. The winding carrier 11 is fixed with a suitable chucking device in a generally known winding machine. The winding beginning 26 of the exciter winding 24 is extended through the recess 30, so that the winding beginning 26 protrudes laterally beyond the flange 16, and a first layer of the winding wire can be wound onto the tube portion 14 of the winding carrier 11. Because the winding beginning 26 is clamped in place in the recess 30, it is positionally fixed, which prevents the first layer from slipping during the winding operation. In a manner known per se, the exciter winding 24 is now wound to suit its desired dimension, or in other words in accordance with the desired number of layers. Once the exciter winding has reached its intended size, or in other words the winding machine has accomplished its set number of windings for the exciter winding 24, then the end 28, after the winding machine is turned off, is passed through the recess 32 of the flange 16. In the process, the winding end 28 becomes firmly clamped in the recess 32, so that the exciter winding 24 remains at the winding tension, and loosening of the winding package is not possible. After the conclusion of the winding operation, the exciter winding 24 is impregnated in a known manner; here, the entire jacket face 34 is available for imposition or introduction of an impregnating agent into the exciter winding 24. Any hindrance to the penetration of the impregnating agent from additionally mounted binding bands or the like is precluded. Because the impregnating agent can now penetrate uniformly into the exciter winding 24, a homogeneous distribution inside the winding package is possible, so that very high demands in terms of quality can be made of the exciter winding 24.

In FIG. 2, a side view of the winding carrier 11 shown in FIG. 1 is provided, for the sake of clarity. Elements identical to those of FIG. 1 are provided with the same reference numerals and not described again. It becomes clear from the side view that the recesses 30 and 32 are disposed as peripherally open, radially extending slits in the flange 16 of the winding carrier 11. The recess 30 for the winding beginning 26 has a radial length that extends essentially as far as the tube portion 14 of the winding carrier 11. Because of the peripherally open embodiment of the recess 30, it is possible to simply lay the winding beginning 26 in the winding carrier 11, without having to perform complicated threading-in operations. The recess 30 preferably has a radially extending conicity; that is, it tapers in the direction of the tube portion 14. On its base 38, the recess 30 has a width that is equivalent to the diameter of the winding wire, so that the winding wire automatically wedges firmly in the recess 30. The width of the recess 30 at the base 38 can also be optionally chosen to be smaller, if the overall winding carrier 11 comprises a slightly elastic material, so as to preclude constriction of the winding wire as it wedges firmly. After the conclusion of the winding operation, or in other words when the exciter winding has reached a diameter on the intended jacket face 34, the winding end 28 is firmly wedged in the likewise radially extending recess 32, in an entirely analogous way. The recess 32 has a radial length such that it extends to the height of the jacket face 34 of the exciter winding 24. The recess 32 is embodied as a notch, which debouches on one side of the base 40 of the recess 32 whose width is equivalent to the diameter of the winding wire. The walls 33 of this recess 32 adjoin or abut one another. For better firm wedging of the winding end 28, it is provided that this winding end, in front of the recess 32, is passed along a clamping-in segment 42, shown in suggested fashion and extending at a tangent to the exciter winding 24 and located between the exciter winding 24 and the flange 16 of the winding carrier 11. After the completion of the winding operation, the winding end 28 can be drawn in between the exciter winding 24 and the flange 16 by an elasticity of the flange 16. As the winding end 28 is introduced into the recess 32, the wall 33 initially flaps laterally forward. As soon as the winding end 28 has reached the base 40 of the recess 32, wall 33 moves resiliently back to its original position. The fixation of the winding end 28 along the clamping segment 42 is effected by the spring force of the flange 16, by the impregnation of the exciter winding 24, and—as will be explained hereinafter—by pole fingers of the rotor assembly that engage the winding carrier 11 from the outside.

In the side view of the winding carrier 11 it also becomes clear that the portions 36 of the flange 16 and 18 are embodied in tablike fashion, or in other words protuberances 44 and indentations 46 alternate with one another over the circumference of the flanges 16 and 18. The number of protuberances 44 corresponds to the later number of pole fingers, and the contour of the protuberances 44 and indentations 46 is chosen such that the pole fingers are each assigned one protuberance 44, and a spacing existing between two adjacent pole fingers is assigned an indentation 46. The recesses 30 and 32 intended for receiving the winding beginning 26 and winding end 28, respectively, each debouch in an indentation 46; this assures that the winding beginning 26 and the winding end 28 can be extended out of the exciter winding 24 in a region between two adjacent pole fingers.

In FIG. 3, in which one again identical elements to those of FIGS. 1 and 2 are provided with the same reference numerals, a claw pole rotor identified overall by reference numeral 48 is shown in the mounted state. The claw pole rotor 48 is rotatably supported in a starter housing of a generator and thus forms the rotor assembly of the generator. In addition to the winding carrier 11 and the exciter winding 24, the claw pole rotor 48 has a rotor shaft 50, on which the pole core 20 is disposed in a manner fixed against relative rotation. The pole core 20 is disposed such that it comes to rest inside the tube portion 14, and hence within the space encompassed by the exciter winding 24. A pole plate 52 and 54 are disposed in a known manner on the respective face ends of the pole core 20 and terminate integrally in the form of claw poles 56 and 58, respectively. The claw poles 56 and 58 then fit over the exciter winding 24. The claw poles 56 and 58 are disposed such that they alternate over the circumference of the claw pole rotor 48, or in other words extend from either the pole plate 52 or the pole plate 54. The claw poles 56 and 58 thus form pole fingers 60 and 62, which—seen in plan view—come to a point trapezoidally; they mesh with one another, and an interstice is present between them. On assembly of the claw pole rotor 48, the claw poles 56 and 58 are more or less thrust into one another, so that the portions 36 of the winding carrier 11 each come to rest on a respective pole finger 60 or 62 of the claw poles 56 and 58. The portions 38 are bent inward in the process, so that they fit partway around the exciter winding 24. By bending over the portions 36, embodied integrally with the winding carrier 11, a fixation of the exciter winding 24 is achieved, so that even at extremely high rotary speeds the exciter winding 24 cannot come loose, since it is virtually fastened in plane on all sides between the claw poles 56 and 58.

The winding beginning 26 and the winding end 28 of the exciter winding 24 are connected to wiper rings 64 and 66. The wiper rings 64 and 66 are disposed on the rotor shaft 50 in a manner secured against relative rotation, for instance being thrust onto a stub of the rotor shaft 50. The winding beginning 26 and the winding end 28 are extended along the pole plate 54 of the claw pole rotor 48 on the wiper ring side and are contacted with the respective wiper rings 64 and 66. To that end, they may for instance be welded directly to the wiper rings.

In FIGS. 4–6, a further variant embodiment of an exciter coil 10 is shown. Elements identical to those of FIGS. 1–3 are provided with the same reference numerals for the sake of clarity, despite a partially different arrangement, although they still have the same function. In the plan view on the exciter coil 10 shown in FIG. 4, the exciter winding 24 is seen, disposed in the winding carrier 11. The exciter winding 24 has the winding beginning 26, which is passed through a recess 30 that corresponds to the one described in conjunction with FIG. 2. The winding end 28 of the exciter winding 24 fixed to the jacket face 34 of the exciter winding 24 by means of a resin dot 68. The resin dot 68 is disposed such that the last winding of the exciter winding 24 is positioned on the flange 16 toward the wiper ring of the winding carrier 11.

In FIG. 5, in an enlarged detail view of the resin dot 68, it becomes clear that this dot fixes the winding end 28 on the exciter winding 24 or in other words restrains it immovably. This assures that the exciter winding 24 will not loosen under the winding tension. The resin dot 68 is dimensioned such that it can bring to bear the retention forces to fix the winding end 28 by quasi-sticking the winding end 28 firmly to the exciter winding 24. The resin that produces the resin dot 68 penetrates, in the application area, into the interstices in the uppermost layer of the exciter winding, thus assuring a secure, immovable retention of the winding end 28. From the resin dot 68, the winding end 28 is extended to the recess 32 in the flange 18.

The course of the winding end 28 is illustrated in the view of the exciter coil 10 shown in FIG. 6. The view in FIG. 6 shows the exciter coil 10 from the standpoint of the flange 16 toward the wiper ring. From the resin dot 68, the winding end 28 is extended to the base 40 of the recess 32. The recess 32 extends at an angle α to a radial 70 of the exciter coil 10. The angle a here assumes values of approximately 25° to 30°. The base 40 of the recess 32 is approximately located on an imaginary circular line on which the base 38 of the recess 30 is also located. The winding beginning 26 and the winding end 28 of the exciter winding 24 are thus also extended out of the winding carrier 11 at an equal distance from the axis of rotation 12 of the exciter coil 10. Between the resin dot 68 and the base 40 of the recess 32, the winding end 28 extends along the clamping segment 42. The winding end 28 is clamped in place here between the exciter winding 24 and the flange 16 of the winding carrier 11. To that end, the flange 16, because of its elasticity, can be bent outward after the completion of the winding operation of the exciter coil 24, so that the winding end 28 can be threaded into the recess 32. The recess 32 may be formed by a notch extending at the angle a, and the base 40 is formed by a stamped-out portion which is approximately equivalent to the diameter of the winding wire.

The resin dot 68 and the base 40 of the recess 32 are offset from one another by an angle β, which is equivalent to an angular segment specified by a claw pole finger (designed in FIG. 3 as claw pole 58 and pole finger 62). In the claw pole rotor shown in these examples, the rotor has six claw pole fingers on each flange side of the winding carrier 11. The angle β is thus approximately 60°. The resin dot 68 and the base 40 of the recess 32 are now placed such that the clamping segments 42 of the winding end 28 extends entirely beneath one of the claw pole fingers.

In the exemplary embodiment shown in FIGS. 4–6, the advantage is obtained that the fixation of the winding end 28 solely with a resin dot 68 allows an impregnation and saturation of the exciter winding 24 over its entire jacket face 34. Because of the recess 32 extending at an angle α and because of the clamping segment 42, independent loosening of the winding end 28 out of this position is prevented. Even under vibration and at extremely high rotary speeds, causing high centrifugal force strain on the winding end 28, loosening of the winding end 28 can be precluded by the recess 32 extending at an angle a. Because of the bracing of the claw poles with respect to the entire claw pole rotor, an axial pressure is moreover exerted on the exciter winding 24 that reliably assures the firm wedging of the winding end 28 along the clamping path 42.

Overall, it is possible to produce a claw pole rotor, for instance in compact or cup form, that has an exciter winding 24 which is supported in a manner secure against shaking and/or centrifugal strain even in heavy-duty operation. Because additional fastening means, such as binding bands, are dispensed with, an overall weight reduction is achieved, which moreover enables better impregnation of the exciter winding 24.

We claim:

1. An electrical machine formed as a generator for vehicles, comprising a rotor having a rotor shaft and an exciter winding arranged coaxially to said rotor shaft; wiper rings disposed on said rotor shaft, said exciter winding having a winding beginning and a winding end extended to said wiper rings; a winding carrier in which said exciter winding is disposed, said winding carrier being formed by an insulating body which encompasses said exciter winding and which has a flange facing said wiper rings and provided with recesses, said flange of said winding carrier having a smooth wall at an inner side, said recess being open at edges for receiving said winding beginning and said winding end, said winding end being an upper winding end and located in front of one of said recesses and also clamped in place; and a clamping segment which clamps said winding end at a tangent between said exciter winding and said flange of said winding carrier, said flange of said of said winding carrier having an elasticity and fixing said winding end along said clamping segment by a spring force of said flange.

2. An electrical machine as defined in claim 1, wherein said recesses of said flange are formed as opposed recesses.

3. An electrical machine as defined in claim 1, wherein said exciter winding has a jacket face, said one recess for said one winding end extending radially to approximately said jacket face of said exciter winding.

4. An electrical machine as defined in claim 1, wherein said recesses have a width at a base of said recesses which is equivalent to a diameter of a winding wire of said exciter winding.

5. An electrical machine as defined in claim 4, wherein said recess for said one winding end is formed as a notch with walls adjoining one another.

6. An electrical machine as defined in claim 1, wherein said recesses have one recess for said winding end and another recess for said winding beginning, said one recess for said one winding end extending as far as an imaginary circular line and as far as a tube portion on which said other reason for said winding beginning ends.

7. An electrical machine as defined in claim 6, wherein said recess for said one winding end extends at an angle to a radial of said winding carrier.

8. An electrical machine as defined in claim 7, wherein said angle is equal to between 25° and 30°.

9. An electrical machine as defined in claim 1, wherein said winding end is fixed to said exciter winding by an adhesive agent in form of a resin dot and extended along said clamping segment to a base of said one recess, said resin dot and said base of said one recess being offset from one another by an angle.

10. An electrical machine as defined in claim 1, wherein said rotor is a claw pole rotor and has claw poles provided with pole fingers, said angle being equivalent to an angular segment of one of said pole fingers of said claw rotor.

11. An electrical machine as defined in claim 9, wherein said clamping segment extends below said one pole finger.

12. An electrical machine formed as a generator for vehicles, comprising a rotor having a rotor shaft and an exciter winding arranged coaxially to said rotor shaft; wiper rings disposed on said rotor shaft, said exciter winding having a winding beginning and a winding end extended to said wiper rings; a winding carrier in which said exciter winding is disposed, said winding carrier being formed by an insulating body which encompasses said exciter winding and which has a flange facing said wiper rings and provided with recesses, said flange of said winding carrier having a smooth wall at an inner side, said recess being open at edges for receiving said winding beginning and said winding end, said one winding end being an upper winding end and located in front of one of said recesses and also clamped in place; and a clamping segment which clamps said winding end at a tangent between said exciter winding and said flange of said winding carrier, said flange of said winding carrier having an elasticity and fixing said winding end along said clamping segment by a spring force of said flange, said recess for receiving said winding beginning extending radially as far as a base of said winding carrier.

* * * * *